(12) United States Patent
Jablonski

(10) Patent No.: US 9,151,168 B2
(45) Date of Patent: Oct. 6, 2015

(54) TURBINE ENGINE FAN DISK

(75) Inventor: Laurent Jablonski, Melun (FR)

(73) Assignee: SNECMA, Paris (FR)

( * ) Notice: Subject to any disclaimer, the term of this patent is extended or adjusted under 35 U.S.C. 154(b) by 689 days.

(21) Appl. No.: 13/463,123

(22) Filed: May 3, 2012

(65) Prior Publication Data

US 2012/0282104 A1 Nov. 8, 2012

(30) Foreign Application Priority Data

May 6, 2011 (FR) ...................... 11 53932

(51) Int. Cl.
*F01D 5/30* (2006.01)
*F04D 29/32* (2006.01)

(52) U.S. Cl.
CPC ............ *F01D 5/3007* (2013.01); *F04D 29/322* (2013.01); *F05D 2220/36* (2013.01); *Y02T 50/671* (2013.01)

(58) Field of Classification Search
CPC ... F01D 5/3007; F04D 29/322; Y02T 50/671; F05D 2220/36
USPC ............................... 416/219 R, 220 R, 244 A
See application file for complete search history.

(56) References Cited

U.S. PATENT DOCUMENTS

| | | | | |
|---|---|---|---|---|
| 4,033,705 A * | 7/1977 | Luebering | ................. | 416/220 R |
| 4,265,595 A * | 5/1981 | Bucy et al. | ................. | 416/220 R |
| 4,470,756 A * | 9/1984 | Rigo et al. | ................. | 416/220 R |
| 4,604,033 A * | 8/1986 | Surdi | ........................ | 416/220 R |
| 5,049,035 A * | 9/1991 | Marlin | ...................... | 416/193 A |
| 5,052,893 A * | 10/1991 | Catte | .......................... | 416/220 R |
| 5,067,877 A * | 11/1991 | Youssef | ..................... | 416/220 R |
| 5,112,193 A * | 5/1992 | Greer et al. | ................ | 416/220 R |
| 5,486,095 A * | 1/1996 | Rhoda et al. | ............... | 416/214 A |
| 5,540,552 A * | 7/1996 | Surdi | .......................... | 416/220 R |
| 5,624,233 A | 4/1997 | King et al. | | |
| 6,155,788 A * | 12/2000 | Beckford et al. | .......... | 416/219 R |
| 6,416,280 B1 * | 7/2002 | Forrester et al. | ................ | 416/94 |
| 6,467,988 B1 * | 10/2002 | Czachor et al. | ............... | 403/337 |
| 6,595,755 B2 * | 7/2003 | Brioude et al. | ........... | 416/220 R |
| 6,846,159 B2 * | 1/2005 | Zabawa et al. | ..................... | 416/2 |
| 6,910,866 B2 * | 6/2005 | Bassot et al. | .................. | 416/221 |

(Continued)

FOREIGN PATENT DOCUMENTS

EP   1 995 467 A1   11/2008
FR   2 345 605      10/1977

(Continued)

OTHER PUBLICATIONS

French Preliminary Search Report issued Dec. 2, 2011, in French 1153932, filed May 6, 2011 (with English Translation).

*Primary Examiner* — Nathaniel Wiehe
*Assistant Examiner* — Wayne A Lambert
(74) *Attorney, Agent, or Firm* — Oblon, McClelland, Maier & Neustadt, L.L.P.

(57) ABSTRACT

A turbine engine fan disk including a cylindrical rim including in its outer periphery substantially axial slots for mounting blade roots and opening out to a radially upstream face of the rim is provided. A shroud extends from the rim and connects with a rotary drive shaft. A cylindrical lip extends upstream from the upstream face of the rim. The inside surface of the disk having a cylindrical portion extended upstream by a portion of greater diameter that forms a setback that is axially offset upstream relative to the upstream radial face of the rim.

15 Claims, 1 Drawing Sheet

(56) References Cited

U.S. PATENT DOCUMENTS

| | | | |
|---|---|---|---|
| 7,153,102 B2 * | 12/2006 | Stone | 416/219 R |
| 7,241,111 B2 * | 7/2007 | Harding et al. | 415/218.1 |
| 7,578,656 B2 * | 8/2009 | Higgins et al. | 416/244 A |
| 7,918,652 B2 * | 4/2011 | Fujimura | 416/219 R |
| 8,911,210 B2 * | 12/2014 | Bilz et al. | 416/193 A |
| 2007/0207034 A1 * | 9/2007 | Nogami et al. | 416/219 R |
| 2008/0226458 A1 * | 9/2008 | Pierrot et al. | 416/220 R |
| 2009/0022593 A1 | 1/2009 | Oka | |
| 2009/0053064 A1 | 2/2009 | Ress, Jr. | |
| 2009/0269202 A1 * | 10/2009 | Borzakian et al. | 416/220 R |
| 2010/0329873 A1 * | 12/2010 | Ruba et al. | 416/220 R |
| 2013/0315744 A1 * | 11/2013 | Perdrigeon et al. | 416/220 R |

FOREIGN PATENT DOCUMENTS

| | | | |
|---|---|---|---|
| FR | 2 814 495 | | 3/2002 |
| GB | 1523422 A | * | 8/1978 |
| GB | 2 299 834 | | 10/1996 |

\* cited by examiner

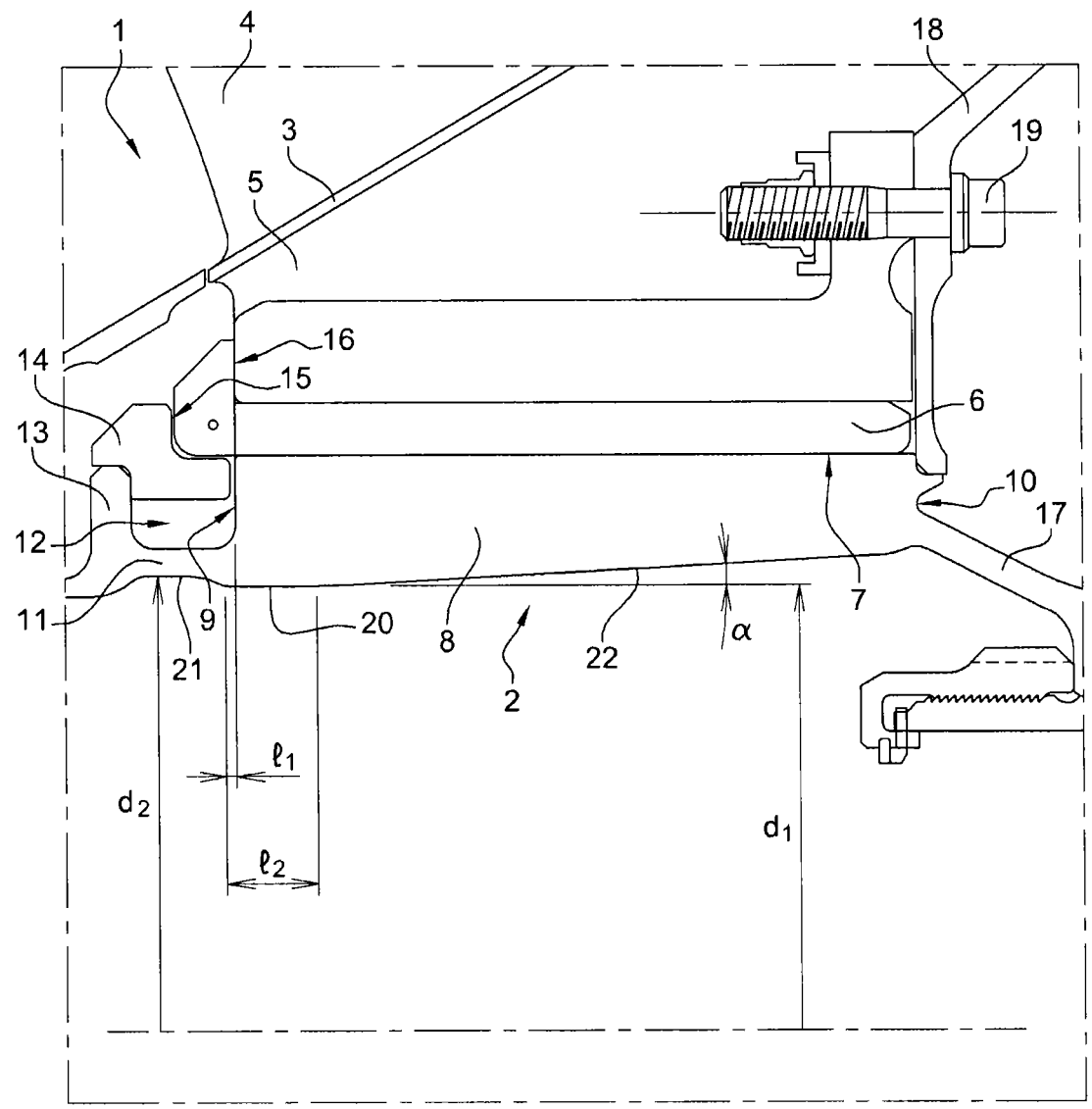

TURBINE ENGINE FAN DISK

FIELD OF THE INVENTION

The present invention relates to a turbine engine fan disk.

BACKGROUND OF THE INVENTION

A turbine engine fan comprises a disk carrying blades having roots engaged in substantially axial slots formed in the outer periphery of the disk. The blades are held radially on the disk by co-operation between the shapes of their roots and the shapes of the slots in the disk, the blade roots being of the dovetail type, for example. Inter-blade platforms are mounted on the disk between the fan blades.

A fan of that type is described in document FR 2 930 595 in the name of the Applicant, and in that document the annular disk does not have balance weights or balance hub, but comprises a rim having upstream and downstream radial faces into which the mounting slots for the blade roots open out. A cylindrical lip extends axially from the upstream radial face of the rim and a groove is formed in the lip upstream from the blades for the purpose of mounting means for retaining the blade roots axially.

The blades are also held axially in the downstream direction by bearing against an annular cheek plate that is fitted onto the downstream end of the rim and that is fastened thereto by bolting, which cheek plate includes an inner annular flange for fastening to the upstream end of a shaft of the turbine engine.

The inside surface of the disk includes a cylindrical portion connected upstream to a larger-diameter portion forming a setback situated downstream from the upstream radial face of the rim.

In operation the radial forces generated by the rotating fan blades generate tangential stresses in the disk in its portion presenting the slots for mounting the blade roots. In addition, bending stresses are created by the above-mentioned lip, in particular in the zone of the setback.

Thus, in that zone, the tangential stresses and the bending stresses are cumulative, thereby leading to risks of the disk breaking or becoming degraded.

OBJECT AND SUMMARY OF THE INVENTION

A particular object of the invention is to provide a solution to that problem that is simple, effective, and inexpensive.

To this end, the invention provides a turbine engine fan disk comprising a cylindrical rim including in its outer periphery substantially axial slots for mounting blade roots and opening out to a radially upstream face of the rim, a shroud extending from the rim and connecting with a rotary drive shaft, and a cylindrical lip extending upstream from the upstream face of the rim, the inside surface of the disk having a cylindrical portion extended upstream by a portion of greater diameter that forms a setback, wherein the setback is offset axially upstream relative to the upstream radial face of the rim.

In this manner, the zone in which the bending stresses appear is offset upstream from the upstream radial face of the disk. The tangential stresses are concentrated in the portion of the disk that is subjected to the radial forces exerted by the blades, i.e. downstream from the upstream radial face, and the bending stresses are concentrated upstream from the upstream radial face, such that those two types of stress are not cumulative in the same portion of the disk.

According to a characteristic of the invention, the setback is offset axially from the upstream radial face by an axial distance lying in the range 1 millimeter (mm) to 3 mm.

Advantageously, the inside surface of the disk includes a frustoconical portion flaring downstream, extending from the cylindrical portion to a downstream end of the rim.

Because of the particular profiles of the blades, it is found that the tangential stresses are not distributed uniformly over the entire length of the rim of the disk, i.e. the portion of the disk in which the slots are formed and situated between the upstream and downstream radial faces of the disks. The tangential stresses are greater in the upstream portion of the rim, i.e. directly downstream from the above-mentioned upstream radial face, and the tangential stresses are smaller in the downstream portion of the rim. The frustoconical portion thus enables the disk to be consolidated in the zone that is subjected to the greatest tangential stresses and enables the disk to be lightened in the zone that is subjected to the smaller tangential stresses.

The angle of the frustoconical portion may lie in the range 1° to 10°, and is preferably about 3°.

The cylindrical end portion preferably has a length lying in the range 10 mm to 20 mm.

In an embodiment of the invention, the disk does not have balance weights or balance hub, thereby giving easy access to a central nut for fastening the disk on the drive shaft of the turbine engine. In addition, depending on the diameter of the fan and taking account of the slenderness of the blades, the volume available for housing the disks may be very small, thereby making it impossible or difficult to accommodate balance weights or balance hub.

The invention also provides a turbine engine such as an airplane turboprop or turbojet, that includes a fan disk of the above-specified type.

BRIEF DESCRIPTION OF THE DRAWING

The invention can be understood and other details, characteristics, and advantages of the invention appear on reading the following description made by way of non-limiting example with reference to the accompanying drawings in which the sole FIGURE is a half-view in longitudinal section of a portion of a fan fitted with a disk of the invention.

This FIGURE shows a fan of a turbine engine comprising blades 1 carried by a disk 2 and between which there are interposed inter-blade platforms 3.

MORE DETAILED DESCRIPTION

Each fan blade 1 comprises an airfoil 4 connected at its radially inner end to a root 5, e.g. of dovetail shape, that is engaged in a substantially axial slot of complementary shape in the disk 2 serving to hold the blade 1 radially on the disk 2. A spacer 6 is interposed between the root 5 of each blade 1 and the bottom 7 of the corresponding slot in the disk 2 in order to prevent the blade 1 from moving radially relative to the disk 2.

The inter-blade platforms 3 form a wall that defines the inside of the passage for the stream of air entering into the turbine engine, and including means that co-operate with corresponding means provided on the disk 2 between the slots for fastening the platforms 3 on the disk 2.

The fan blades 1 are held axially in the slots of the disks 2 by appropriate means mounted on the disk.

The disk 2 essentially comprises a cylindrical rim 8 having no balance weights or balance hub and defined axially by upstream and downstream radial faces 9 and 10 into which the slots for mounting the blade roots 4 open out. The disk is made of a nickel-based alloy, e.g. Inconel 718, or out of a titanium-based alloy.

The disk 2 also has a cylindrical lip 11 extending axially upstream from the upstream radial face and having an outside surface that includes an annular groove 12, as is already known. The groove 12 is defined by the upstream radial face 9 of the disk and by a flange 13 extending radially outwards.

The means for retaining the blades 1 comprise a ring 14 inserted by jaw clutching in the groove 12 and including a radial surface 15 serving as the axial abutment for the spacers 6, the blade roots 4 themselves bearing against a radial surface 16 of the spacers 6.

The disk 2 also includes a shroud 17 extending from the downstream end of the rim 8 and connecting it to a rotary drive shaft (not shown).

The blades 1 are held axially downstream by bearing against an annular cheek plate 18 fastened to the disk 2 by means of bolts 19.

The inside surface of the disk 2 has a cylindrical portion 20 of diameter $d_1$ that is extended upstream by a portion 21 of greater diameter $d_2$, thereby forming a setback. By way of example the diameter $d_1$ is about 160 mm and the diameter $d_2$ is about 155 mm.

The setback 21 is offset axially from the upstream radial face 9 of the rim 8 in the upstream direction by a distance $l_1$ that lies in the range 1 mm to 3 mm.

The length $l_2$ of the cylindrical portion 20 lies in the range 10 mm to 20 mm.

The inside surface of the disk 2 also has a frustoconical portion 22 that flares downstream, extending from the cylindrical portion 20 to the downstream end of the rim 8.

The angle $\alpha$ of the frustoconical portion 22 lies in the range 1° to 10°, and is preferably about 3°.

As mentioned above, the offset of the setback 21 relative to the upstream radial face 9 of the rim 8 makes it possible to dissociate the tangential stresses and the bending stresses that appear in the disk 2 in operation, thereby avoiding any risk of the disk 2 breaking or being degraded. The frustoconical portion 22 serves to reinforce the disk 2 in the zones having the greatest tangential stresses and to lighten the disk 2 in the zones having the smallest tangential stresses.

What is claimed is:

1. A turbine engine fan disk having an axis and comprising:
    a rim including slots, at a radially outer periphery, for mounting blade roots in the slots, the slots opening out to an upstream radial face of the rim;
    a shroud extending from the rim and connecting with a rotary drive shaft; and
    a lip extending upstream from the upstream radial face of the rim, the lip having a radially inside surface provided with a concave setback which is offset both:
    axially upstream relative to the upstream radial face of the rim, and
    radially relative to a radially inside surface of the disk.

2. The turbine engine fan disk according to claim 1, wherein the setback is offset axially from the upstream radial face of the rim by an axial distance lying in the range 1 mm to 3 mm.

3. The turbine engine fan disk according to claim 1, wherein the radially inside surface of the disk includes a frustoconical portion flaring downstream and extending to a downstream end of the rim.

4. A turbine engine fan disk according to claim 3, wherein the angle of the frustoconical portion lies in the range 1° to 10°.

5. The turbine engine fan disk according to claim 4, wherein the angle of the frustoconical portion is about 3°.

6. A turbine engine fan disk having an axis and comprising:
    a rim including slots, at a radially outer periphery, for mounting blade roots in the slots, the slots opening out to an upstream radial face of the rim;
    a shroud extending from the rim and connecting with a rotary drive shaft;
    a lip extending upstream from an upstream radial face of the rim, the lip having a radially inside surface provided with a concave setback which is offset both:
    axially upstream relative to the upstream radial face of the rim, and
    radially relative to a radially inside surface of the disk,
    wherein the lip has a radially outside surface that includes an annular groove in which a ring is partially engaged, for retaining blades.

7. The turbine engine fan disk according to claim 1, wherein the disk has a radially inner surface having a cylindrical portion at an upstream end, the cylindrical portion extending parallel to the axis and having a length lying in the range 10 mm to 20 mm.

8. The turbine engine fan disk according to claim 1, wherein it does not include balance weights or balance hub.

9. A turbine engine, including a turbine engine fan disk according to claim 1.

10. The turbine engine fan disk according to claim 1, wherein the lip has a radially outside surface that includes an annular groove in which a ring is partially engaged, for retaining blades.

11. The turbine engine fan disk according to claim 10, wherein the annular groove is defined by an upstream radial face of the disk and by a flange of the lip extending radially outwards.

12. The turbine engine fan disk according to claim 1, wherein the radially inside surface of the disk has a frustoconical portion that flares downstream.

13. The turbine engine fan disk according to claim 6, wherein the ring includes an upstream inner radial surface which abuts an outer radial surface of the flange of the lip, and a downstream outer radial surface which abuts an inner radial surface of a spacer interposed between one of the blade roots and one of the slots.

14. The turbine engine fan disk according to claim 6, wherein the groove is defined by an upstream radial face of the disk and by a flange of the lip extending radially outwards.

15. The turbine engine fan disk according to claim 6, wherein the radially inside surface of the disk has a frustoconical portion that flares downstream.

* * * * *